Patented Mar. 11, 1930

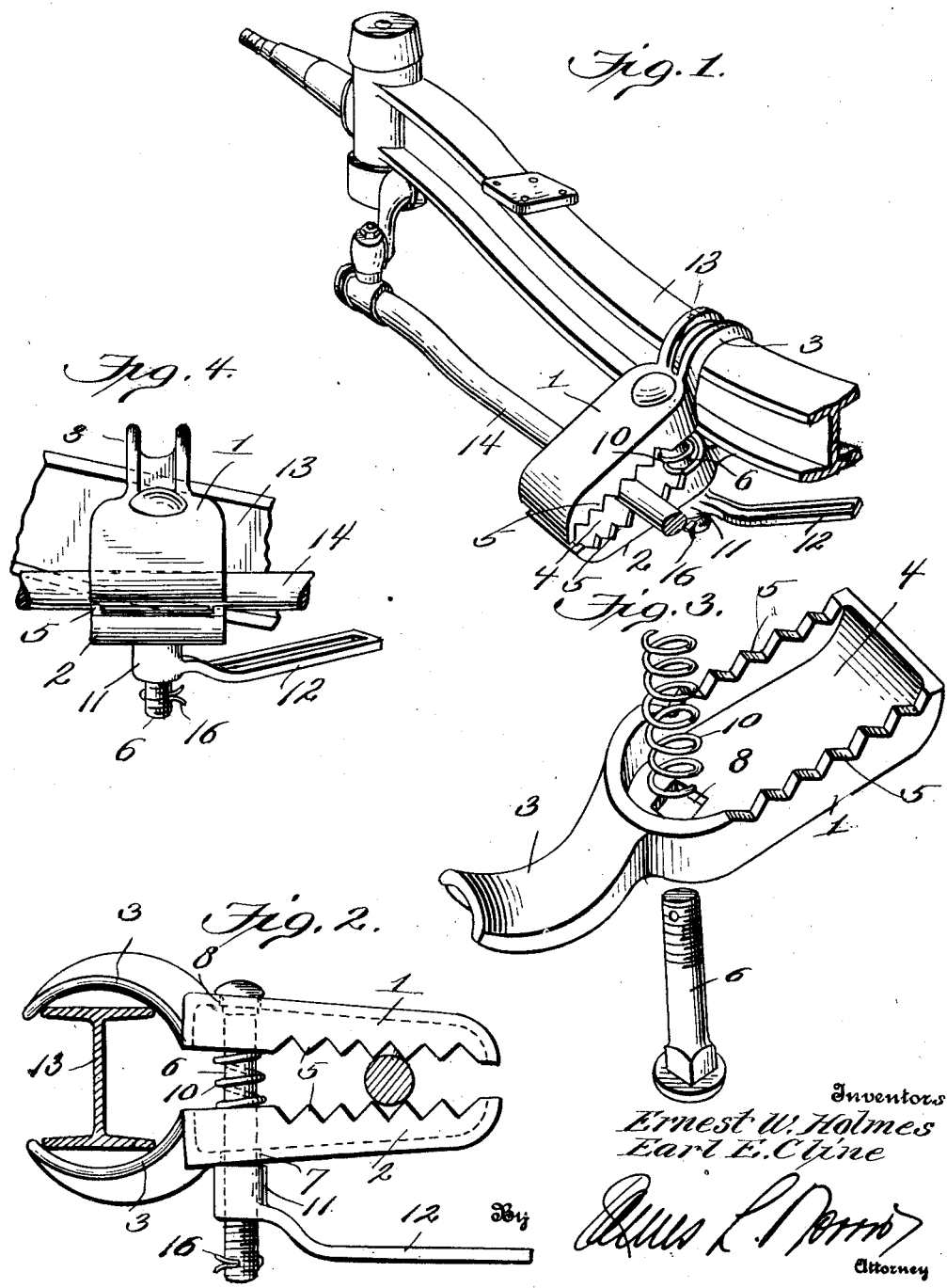

1,750,599

UNITED STATES PATENT OFFICE

ERNEST W. HOLMES AND EARL E. CLINE, OF CHATTANOOGA, TENNESSEE, ASSIGNORS TO ERNEST HOLMES COMPANY, OF CHATTANOOGA, TENNESSEE, A CORPORATION OF TENNESSEE

STEERING-GEAR CLAMP FOR TOWED AUTOMOBILES

Application filed October 16, 1926. Serial No. 142,096.

This invention relates to apparatus accessory to the towing of disabled automobiles and consists of a clamp adapted to engage both the front axle of the automobile and the connecting rod which links together the spindle arms of the front wheels, so that the connecting rod can be held rigidly to the axle in such position as to maintain the front wheels parallel for the purpose of enabling the disabled automobile to be towed backwards with the rear end off the ground.

The object of the invention is to construct a clamp of such universality of adjustment as to be particularly adapted to the requirements of a clamp intended for the specific purpose herein described.

It is to be understood that frequently the damage to an automobile is of such nature that to tow the automobile the rear end must be lifted from the ground. Heretofore a practical difficulty has arisen in towing thus, since the front or steering wheels will not "track" of themselves, but wobble from one side to the other imparting to the automobile a swaying motion which renders its handling in this manner exceedingly unsatisfactory as well as dangerous. In designing a clamp to perform the specified purpose of the present invention consideration must be given to the fact that the axle is not always straight throughout its length, curved or inclined portions frequently being encountered and that the connecting rod does not always lie in the plane of the axle, in some cars being above, and in some below it, and in many instances inclined with respect to the axle.

The present clamp, the novel construction of which makes it adaptable to all these and other conditions is illustrated in the drawings in which—

Figure 1 is a perspective view showing a portion of the front axle of an automobile and the connecting rod, with a clamp embracing the principles of our invention applied thereto.

Figure 2 is a side elevation of the clamp.

Figure 3 is a perspective view of the upper or lower bar, both being alike, showing also the bolt and spring in disassembled relation.

Figure 4 is a rear end view of the clamp.

Referring now in detail to the several figures, the numerals 1 and 2 represent the upper and lower clamp bars in the preferred form of my invention. It will be observed that each clamp bar consists of a hook 3 at one end having a convex inner face, and a jaw 4 at the other end having spaced toothed margins 5. The principle of three point or triangular gripping contact has been carried out in the construction of the bars, which are assembled into a clamp with the hooked ends in cooperation and the toothed portions of said bars also in cooperation. The bars are preferably connected by a carriage bolt 6 which passes through holes 7 and 8 in said bars of somewhat greater size than said bolt so as to permit a tilting motion of said bars relative to said bolt in any direction. The hole 8 is preferably square to cooperate in the usual manner with the square shoulder of the carriage bolt. A spring 10 normally acts to spread the bars, and a nut 11 having a handle 12 screws upon the bolt 6, forcing the bars into clamping relation. A cotter pin 16 passing through the bolt below the nut holds the parts in permanently assembled relation. On account of the fore and aft tilting capacity of the bars they are capable of embracing any sized axle and while at the same time gripping a connecting rod of any diameter and at any distance from said axle.

It is immaterial whether the clamp is brought into engagement with the axle at a straight or curved portion, or a part relatively inclined to the connecting rod in so far as the gripping efficiency of the clamp is concerned, due to the flexibility in the use of the same which arises from the three point contact principle.

As illustrating the application of our invention to relatively inclined members, the axle is shown at 13 in Figure 4 and the connecting rod at 14 said members being angularly disposed. The clamp is shown with the broad jaws 7 and 8 in clamped relation to the connecting rod, the narrowed hooked ends 3 engaging the axle. By reason, however, of the inclination of the axle to the connecting rods, the hooked ends engage the same to one side of the axes of symmetry of the convex faces. It will thus be seen that while the connecting rod is positively gripped over quite an appreciable longitudinal distance the axle 13 is rigidly held by a point to point contact, just as positive but capable of shifting according to the degree of relative inclination of the axle to the connecting rod at the point to which the clamp is applied.

One of the particular advantages of the invention is that the spring 10 expands when the nut 11 is loosened or backed toward the end of the bolt 6, it thus keeping the jaws apart so that the clamp is easy to apply to the steering rod and axle and that regardless of the relative sizes of the axle and connecting rod which the clamp has simultaneously to embrace, the play between the bolt and the bars 1 and 2 permits the latter to be drawn into firm engagement with both the axle and connecting rod through the tilting of the bars. The cotter pin 16 keeps all the parts in assembled relation so that the clamp is always in condition for constant use.

It is to be understood that the invention may be embodied in other forms than those illustrated in the drawings accompanying the present specification and that the application is limited only by the expressed terms of the appended claims.

Having described our invention what we claim as new and desire to secure by Letters Patent, is:—

1. A clamp for holding the steering rod of an automobile immovable with respect to the front axle thereof, comprising upper and lower members adjustably connected intermediately of their ends and having jaws at their ends to engage the steering rod and axle respectively, one jaw of one of said members being relatively broad and the other jaw thereof relatively narrow, said narrow jaw being longitudinally concave and transversely convex on the side thereof confronting the other of said members.

2. A clamp for holding the steering rod of an automobile immovable with respect to the front axle thereof, comprising cooperative clamping members having longitudinally straight transversely broad steering rod clamping faces at one end and narrow transversely convex axle clamping faces at the other end, the broad steering rod engaging faces being toothed, and means for drawing said members together to concurrently grip the steering rod and axle.

3. A clamp for holding the steering rod of an automobile immovable with respect to the front axle thereof, comprising cooperative opposed clamping members having substantially longitudinally parallel transversely broad steering rod clamping faces at one end and narrow longitudinally concave transversely convex axle clamping faces at the other end, and means connecting said members so as to permit rocking thereof to accommodate the clamping faces to the steering rod and axle respectively and operative to draw said members together to clamp said rod and axle.

In testimony whereof we have hereunto set our hands.

ERNEST W. HOLMES.
EARL E. CLINE.